US011056952B2

(12) United States Patent
Payne et al.

(10) Patent No.: US 11,056,952 B2
(45) Date of Patent: Jul. 6, 2021

(54) ELECTRIC MACHINE WITH INTERNAL COOLING PASSAGEWAYS

(71) Applicant: SCHAEFFLER TECHNOLOGIES AG & CO. KG, Herzogenaurach (DE)

(72) Inventors: Matthew Payne, Glenmont, OH (US); Markus Steinberger, Macedonia, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 213 days.

(21) Appl. No.: 16/288,541

(22) Filed: Feb. 28, 2019

(65) Prior Publication Data

US 2020/0280244 A1 Sep. 3, 2020

(51) Int. Cl.
*H02K 9/197* (2006.01)

(52) U.S. Cl.
CPC ......... *H02K 9/197* (2013.01); *H02K 2209/00* (2013.01)

(58) Field of Classification Search
CPC .............. H02K 9/19; H02K 7/12; H02K 1/12
USPC ........................................ 310/52, 54, 58–59
See application file for complete search history.

(56) References Cited

U.S. PATENT DOCUMENTS

| 2,285,960 A | * | 6/1942 | Fechheimer | ........... H02K 9/197 310/54 |
| 2,975,309 A | | 3/1961 | Seidner | |
| 2013/0334912 A1 | * | 12/2013 | Tokunaga | ................ H02K 1/32 310/54 |

FOREIGN PATENT DOCUMENTS

| CN | 105322717 B | | 8/2018 |
| CN | 108649749 A | * | 10/2018 |
| CN | 108649749 A | | 10/2018 |
| JP | 2008511271 A | | 4/2008 |
| JP | 2009261181 A | * | 11/2009 |
| JP | 2009261181 A | | 11/2009 |
| WO | 9508861 A1 | | 3/1995 |

OTHER PUBLICATIONS

Machine Translation CN 108649749 (Year: 2018).*
International Search Report and Written Opinion PCT Application No. PCT/US2020/019811, dated Jun. 18, 2020, 8 pages.

* cited by examiner

*Primary Examiner* — Jose A Gonzalez Quinones
(74) *Attorney, Agent, or Firm* — Dickinson Wright PLLC (57) ABSTRACT

An electric machine includes a stator core having opposing first and second end faces, an outer surface between the end faces, and a plurality of fluid passageways defined within the stator core. Each fluid passageway includes an entrance hole defined in the outer surface and an inboard passage extending along a length of the core and in fluid communication with the entrance hole. Each fluid passageway further includes an outboard passage extending along a length of the core and having a first exit hole defined in the first end face and an interconnecting passage connecting the inboard passage in fluid communication with the outboard passage.

14 Claims, 6 Drawing Sheets

ELECTRIC MACHINE WITH INTERNAL COOLING PASSAGEWAYS

TECHNICAL FIELD

The present disclosure relates to electric machines and more specifically to internal cooling passageways defined in the stator core.

BACKGROUND

Electric machines typically include a stator having a stator core and cooper windings. Different winding arrangements are known such as distributed, concentrated, and hairpin. A rotor of the electric machine is supported for rotation within the stator core. The stator and rotor cooperate to convert electrical energy into mechanical motion or vice versa. The electric machine may be referred to as a motor when used to produce mechanical motion from electrical energy and may be referred to as a generator when used to produce electrical energy from mechanical motion. Electric machines generate heat during use. Many electric machines include a thermal-management system to cool the stator, the rotor, or both. Spray cooling is common type of thermal-management system in automotive applications. A spray cooling system may include nozzles external to the electric machine that deliver oil to the electric machine. The oil absorbs heat as it cascades down the electric machine effectuating cooling.

SUMMARY

According to one embodiment, an electric machine includes a stator core having opposing first and second end faces, an outer surface between the end faces, and a plurality of fluid passageways defined within the stator core. Each fluid passageway includes an entrance hole defined in the outer surface and an inboard passage extending along a length of the core and in fluid communication with the entrance hole. Each fluid passageway further includes an outboard passage extending along a length of the core and having a first exit hole defined in the first end face and an interconnecting passage connecting the inboard passage in fluid communication with the outboard passage.

According to another embodiment, an electric machine includes a stator core having a plurality of stacked laminations that include at least first and second sets of laminations that are different. Each of the first laminations defines a first pattern of fluid openings, and each of the second laminations defines a second pattern of fluid openings that is different than the first pattern. The first set of laminations are stacked together with the openings aligned to form a first arrangement of fluid passages therethrough, and the second set of laminations are stacked together with the openings aligned to form a second arrangement of fluid passages therethrough.

According to yet another embodiment, an electric machine includes a stator housing having an inner surface defining a recessed annular fluid chamber. A stator core is received in the stator housing and has an outer surface disposed against the inner surface. The stator core defines at least one fluid passageway having an entry hole defined in the outer surface and opening into the annular fluid chamber. The passageway also has a first passage defined in the stator core and extending substantially axially.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to also include a plurality of components.

The term "substantially" or "about" may be used herein to describe disclosed or claimed embodiments. The term "substantially" or "about" may modify a value or relative characteristic disclosed or claimed in the present disclosure. In such instances, "substantially" or "about" may signify that the value or relative characteristic it modifies is within ±2 percent of the value or relative characteristic.

Figure 1:
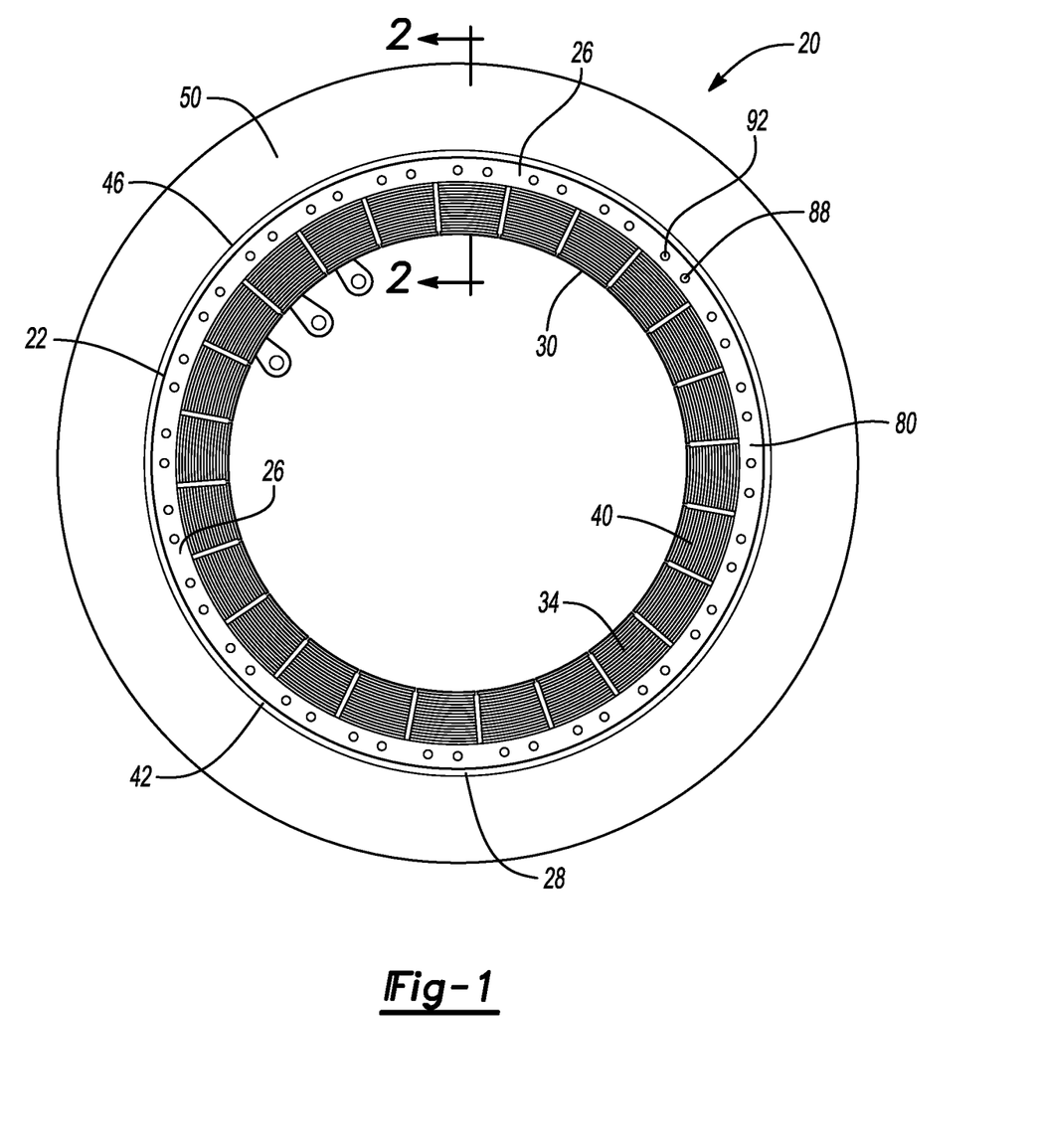
FIG. 1 is an end view of an electric machine without showing a rotor for illustrative purposes.
Figure 2:
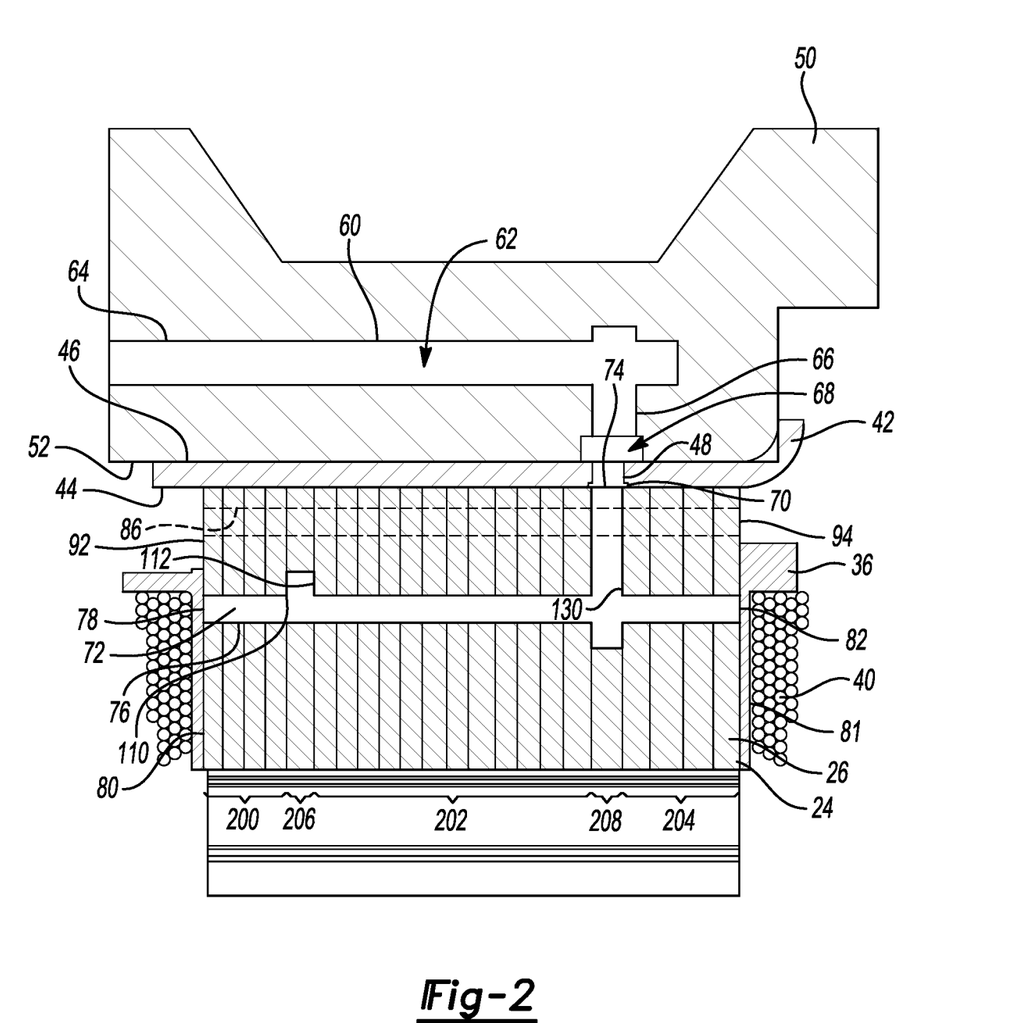
FIG. 2 is a cross-sectional view of the electric machine along cutline 2-2.

Referring to FIGS. 1 and 2, an example electric machine 20 includes a stator 22 having a plurality of laminations 24. The electric machine 20 may be a motor, a generator, or both. Each of the laminations 24 includes a front side and a back side. When fully formed and stacked, the front and back sides are disposed against adjacent front and back sides to form a stator core 26. The stator core 26 is typically made of iron, but may be formed of other materials. The stator core 26 is tubular and defines a hollow center. The stator core 26 has an outer surface 28 that defines the outer diameter and an inner diameter 30. The stator core 26 defines a plurality of teeth 34 extending radially inward toward the inner diameter 30. Bobbins 36 are received on the teeth 34. The bobbins 36 support windings 40 that are wound around the bobbins 36. The illustrated embodiment shows concentrated windings, but the electric machine 20 may be a hairpin winding machine or a distributed winding machine in other embodiments. The illustrated embodiment also shows twenty-four teeth and bobbins, but more or less may be used.

A rotor (not shown) is supported for rotation within the stator core 26. The rotor may be fixed to a shaft or other output. When current is supplied to the stator 22, a magnetic field is created causing the rotor to spin within the stator 22 generating power that is supplied to a load.

The stator 26 is supported by a stator housing 42 (sometimes called a stator rim). The stator housing 42 may be generally cylindrical and includes an inner surface 44 that is disposed against the outer surface 28 of the stator core 26 and an outer surface 46. The stator housing 42 is mounted in a case 50. The case 50 may be a transmission case or the like. The case 50 defines an inner surface 52 that is disposed against the outer surface 46 of the stator housing 42.

During operation, the electric machine 20 generates heat within the stator core 26 and the windings 40. To prevent overheating of the electric machine 20, a fluid circuit may be provided to remove heat generated during operation. The fluid circuit delivers a cooling medium such as oil. The oil may be automatic transmission fluid (ATF). The fluid circuit may travel through the case 50, the stator housing 42, the stator core 26, and combinations thereof.

According to one embodiment, a fluid circuit 60 includes a main supply passageway 62 defined in the case 50. The passageway 62 may include a passage 64 extending substantially axially and a passage 66 extending substantially radially. The case 50 defines an annular fluid chamber 68 recessed into the inner surface 52. The passage 66 extends between the passage 64 and the fluid chamber 68. The fluid chamber 68 may completely encircle the stator housing 42 and is configured to accumulate fluid therein and supply it to the stator core 26. Stator housing 42 defines a plurality of holes 48 extending between the inner surface 44 and the outer surface 46. The holes 48 are in fluid communication with the chamber 68 and permit fluid within the chamber 68 to flow to the stator core 26. The holes 48 may be axially aligned with each other and circumferentially arranged in an array that at least partially encircles the housing 42. The stator housing 42 also defines an annular fluid chamber 70 that is recessed into the inner surface 44. The holes 48 supply fluid to the chamber 70. The chamber 70 may be smaller than the chamber 68. The annular chambers 68 and 70 and the holes 48 may be located at a same axial location with the outer annular chamber 68 circumscribing the inner annular chamber 70.

The stator core 26 defines at least one internal fluid passageway 72 that is part of the fluid circuit 60. The number of passageways 72 depends upon the cooling requirements of the electric machine 20. The passageways 72 are circumferentially spaced relative to each other. In the illustrated embodiment, twenty-four fluid passageways 72 are provided, i.e., each bobbin 36 includes an associated passageway 72, and the fluid passageways 72 are equally spaced. In other embodiments, more or less passageways may be used and the spacing may be equal or unequal. The passageways 72 are configured to circulate fluid through the stator core 26 and to supply fluid onto the windings 40, which removes heat from the electric machine 20. Gravity removes the fluid from electric machine 20, which is collected in a sump for recirculation.

The annular chamber 70 at least partially encircles the outer surface 28 of the stator core 26 and acts as a manifold for supplying fluid to the at least one passageway 72. Each passageway 72 includes an entrance hole 74 defined in the outer surface 28. The entrance hole 74 is axially aligned with the fluid chamber 70 and is configured to receive fluid therefrom. The entrance holes 74 may be circumferentially arranged around the outer surface 28 to at least partially encircle the stator core 26. In the illustrated embodiment, the entrance holes 74 completely encircle the stator core 26.

Figure 3:
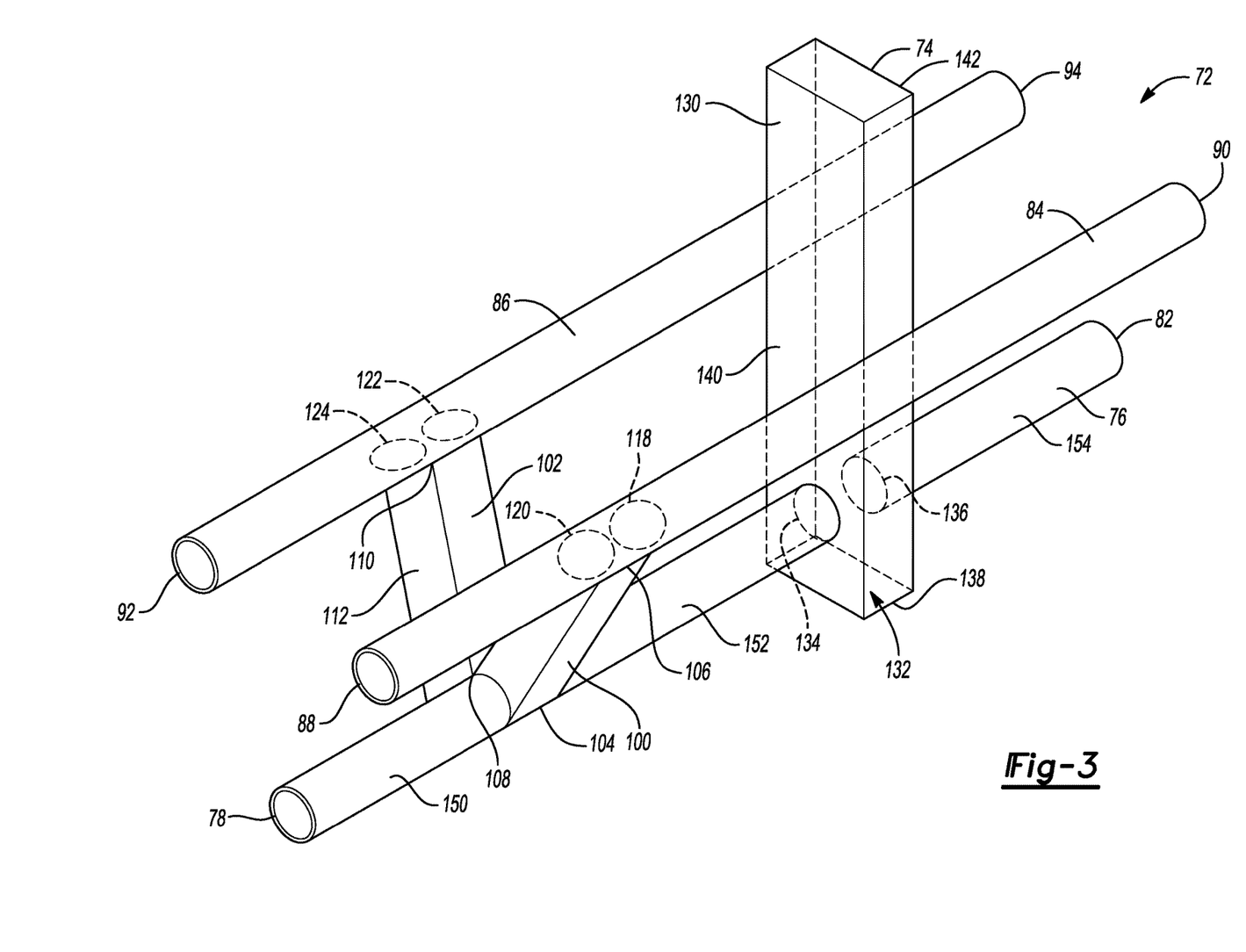
FIG. 3 is a schematic perspective view showing an example cooling passageway of the electric machine as a solid. The passages and chambers of the cooling passage shown in FIG. 3 are not actual structural components disposed within the stator core. Rather, the stator core defines the boundaries of the passageway which is a void space therein.

Referring to FIGS. 1, 2, and 3, each passageway 72 also includes an inboard passage 76 extending substantially axially along a length of the core 26 and in fluid communication with the entrance hole 74. The passage 76 may extend completely through the core 26 in which case a first hole 78 is defined in a first end face 80 of the core 26 and a second hole 82 is defined in a second end face 81. The holes 78 and 82 are covered by the bobbins 36. The bobbins 36 generally prevent fluid from flowing through the holes 78 and 82 but may not completely seal and some oil may flow through these holes 78, 82.

Each passageway 72 further includes at least one outboard passage extending generally axially along a length of the core 26 and in fluid communication with the passage 76. (The terms "inboard" and "outboard" refer to relative locations from the inner diameter of the stator core. Inboard refers to items closer to the inner diameter and outboard refers to items farther from the inner diameter.) For example, the passageway 72 includes a first outboard passage 84 and a second outboard passage 86. The passage 84 may extend completely through the core 26 and have a first exit hole 88 defined in the first end face 80 and a second exit hole 90 defined in the second end face 81. The passage 86 may also extend completely through the core 26 and have a first exit hole 92 defined in the first end face 80 and a second exit hole 94 defined in the second end face 81. The exit holes 88, 90, 92, 94 form the terminus of the passageway 72 and are circumferentially aligned with the bobbins 36 to supply oil onto the windings 40.

Each passageway 72 includes at least one interconnecting passage that fluidly connects the at least one outboard passage to the inboard passage. In the illustrated embodiment, a first interconnecting passage 100 connects between the outboard passage 84 and the inboard passage 76, and a second interconnecting passage 102 connects between the outboard passage 86 and the inboard passage 76. The passage 100 includes a first end 104 connected to the inboard passage 76 and a second end 106 connected to the outboard passage 84. The passage 102 includes a first end 108 connected to the inboard passage 76 and a second end 110 connected to the outboard passage 86. The interconnecting passages generally extend outwardly from the inner diameter towards the outer diameter. In some embodiments, the interconnecting passages may extend radially, in others, they may extend at an oblique angle as shown in FIG. 3 for example. The orientation of the interconnecting passages may include an axial component or may only include radial and circumferential components as shown in FIG. 3 for example.

Figure 4:
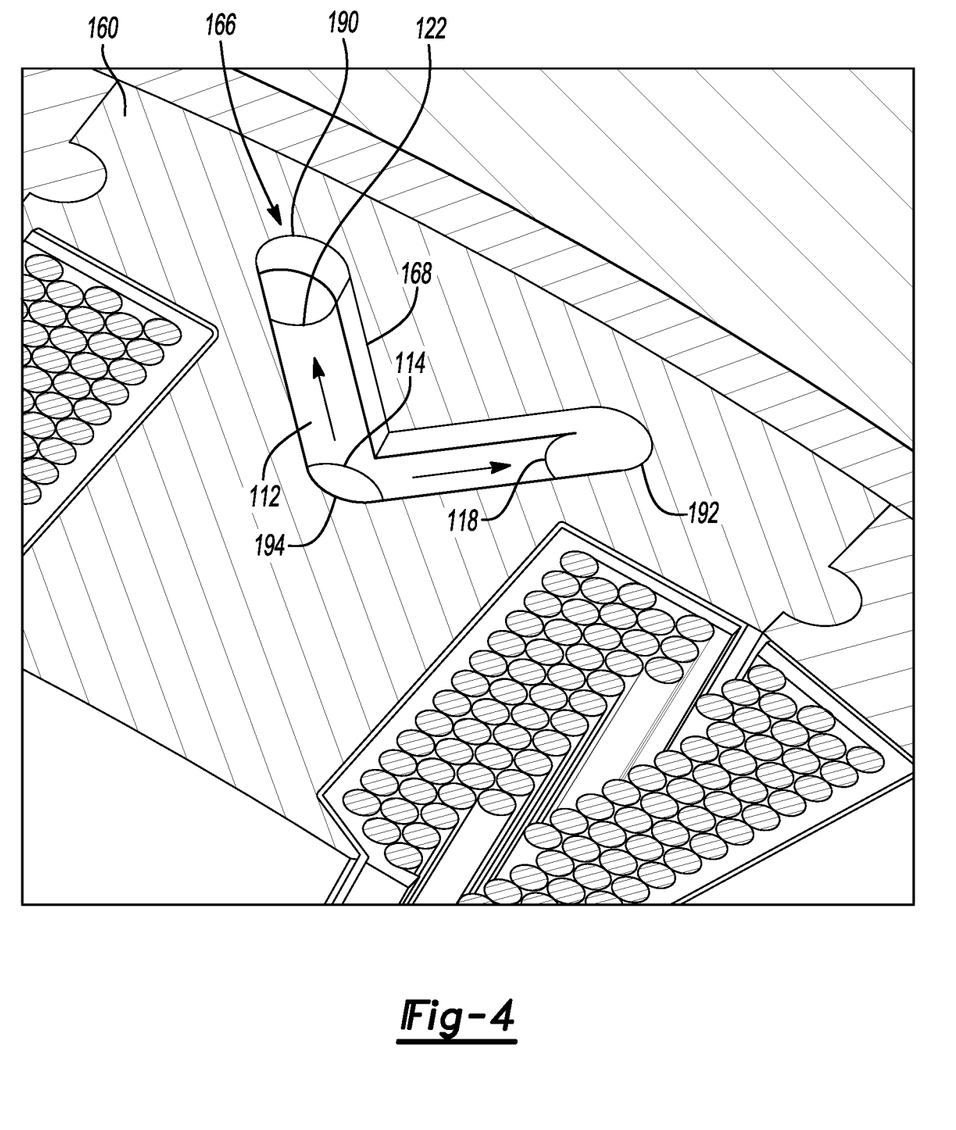
FIG. 4 is a cross-sectional view of the stator core, at a first axial position, showing a first set of laminations.

Referring to FIGS. 3 and 4, the first and second interconnecting passages may be portions of a single chamber (as illustrated) or may be two separate passages. For example, the stator core 26 may define a V-shaped chamber 112 that includes the first and second passages 100, 102. The chamber 112 may have other shapes in different embodiments. The chamber 112 may be disposed within a middle portion or the core 26 to be axially offset from the end faces 80, 81.

In the illustrated embodiment, the chamber 112 is closer to the end face 80, however, the chamber 112 may be located anywhere within the stator core 26. The inboard passage 76 is in fluid communication with the chamber 112 via an inlet opening 114 and an outlet opening 116 (see FIG. 2). The inboard passage 76 may be continuous through the chamber 112 or may be discontinuous as shown. The chamber 112 is in fluid communication with the outboard passage 84 via openings 118 and 120, and the chamber 112 is in fluid communication with the outboard passage 86 via openings 122 and 124.

Figure 5:
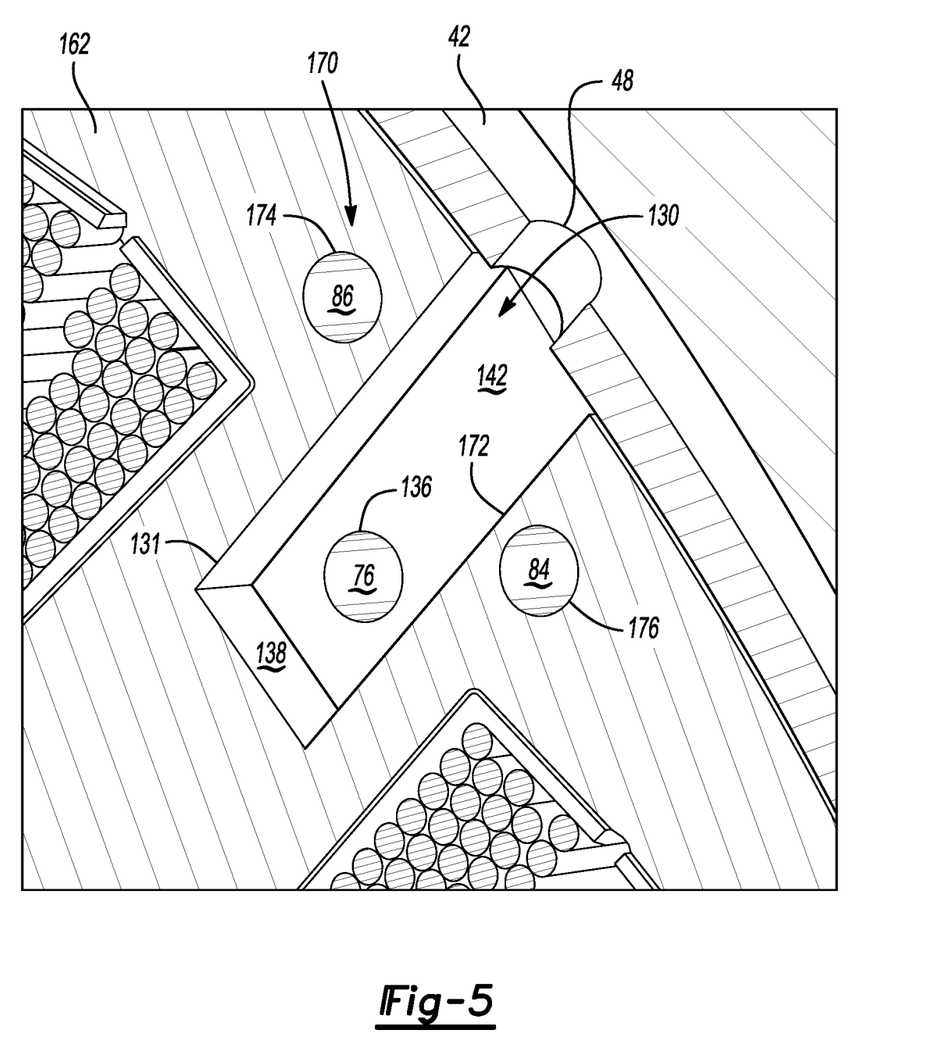
FIG. 5 is a cross-sectional view of the stator core, at a second axial position showing, a second set of laminations.

Referring to FIGS. 3 and 5, the passageway 72 includes a supply passage that extending from the entrance hole 74 to the inboard passage 76. The supply passage may extend substantially radially. The supply passage may be a rectangular chamber 130 defined by cutouts 131 in the stator core 26. The supply chamber 130 extends from the entrance hole 74 to a bottom 138. The inboard passage 76 intersects the supply chamber 130 above the bottom 138 so that the supply chamber 130 has a sump portion 132. The inboard passage 76 is in fluid communication with the supply chamber 130 via openings 134 and 136 defined in opposing walls 140 and 142. The inboard passage 76 may be discontinuous as shown in the illustrated embodiments. The passage 76 may be discontinuous at the supply chamber 130 and the V-chamber 112. That is, the inboard passage 76 may have three segments 150, 152, and 154 in fluid communication with each other.

During operation, fluid in the inner annular chamber 70 flows to the passageways 72 via the entrance holes 74. For each passageway 72, fluid flows into the supply chamber 130 and subsequently to the inboard passage 76 via openings 134, 136. Fluid then transfers to the chamber 112 by flowing axially through the stator core 26, which transfers heat from the stator core 26 to the fluid. The chamber 112 distributes fluid to the outboard passages 84 and 86 via the interconnecting passages 100 and 102, respectively. The outboard passages 84 and 86 convey the fluid through the stator core 26 and to the exit holes 88, 90, 92, 94 where the fluid exits the stator core 26 and drips onto the windings 40.

Figure 6:
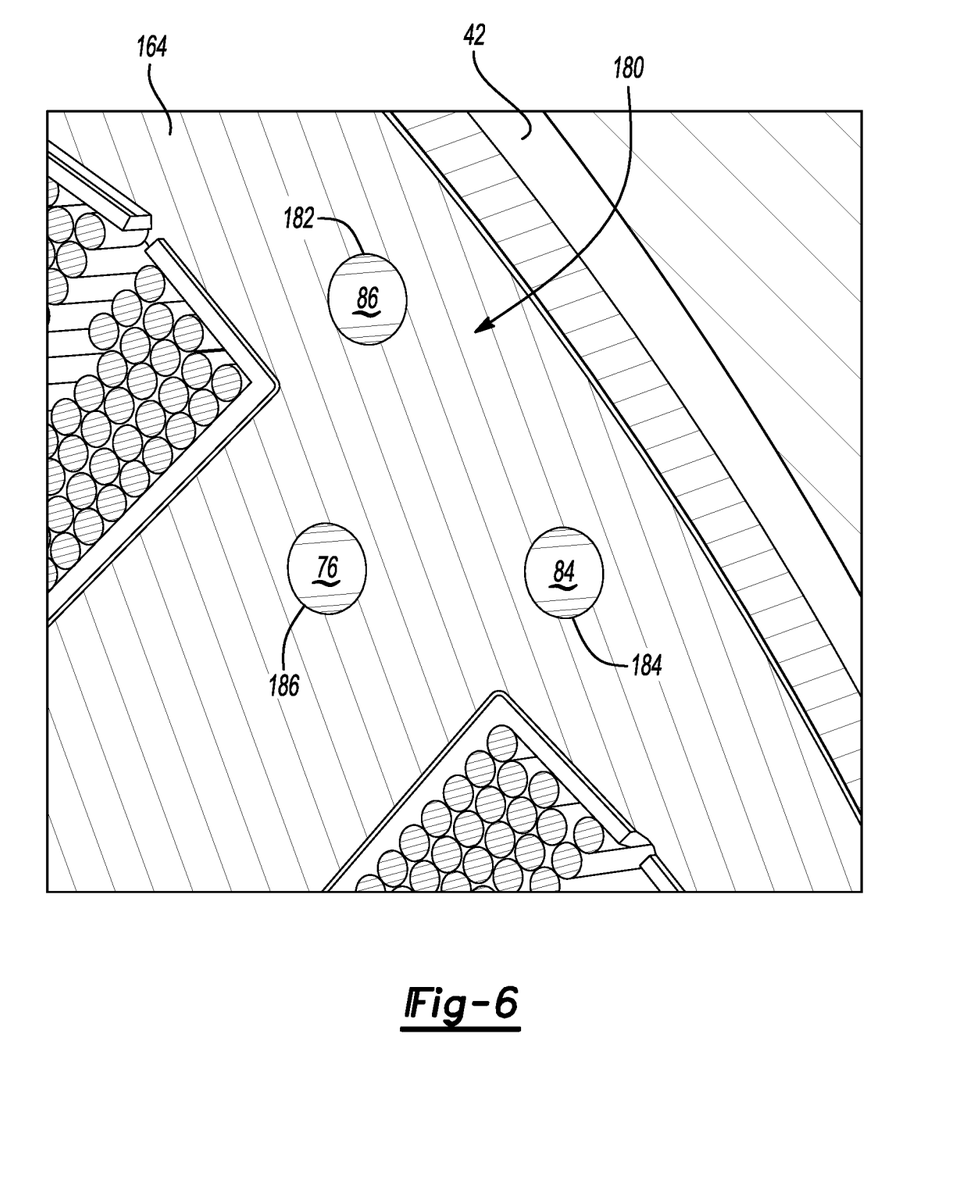
FIG. 6 is a cross-sectional view of the stator core, at a third axial position, showing a third set of laminations.

Referring to FIGS. 4, 5, and 6, the laminations 24 may be formed by stamping. The stamping process may form one or more fluid openings in the laminations that, when stacked to form the core 26, cooperate to define the passageways 72. The core 26 may include one or more sets of laminations that have different patterns of fluid openings. The different patterns may have both common openings and distinct openings. The openings may differ in location, size, shape, and the like. The laminations 24 are stacked such that one or more of the fluid openings are rotationally aligned to form the passageways 72. The different sets of laminations may form different arrangements of passages and/or chambers of the passageways 72.

In the illustrated embodiment, the stator core 26 includes three different sets of laminations 160, 162, and 164. The first set of laminations 160 have a first pattern of openings 166 that cooperate to define the one or more V-chambers 112 when stacked. The first pattern of openings 166 may include a V-shaped opening 168.

The second set of laminations 162 have a second pattern of openings 170 that cooperate to define the supply chamber 130 and the outboard passages 84 and 86. The second pattern of openings 170 may include a rectangular slot 172 and a pair of holes 174 and 176 disposed on opposite sides of the slot 172. The rectangular slots 172 cooperate to define the supply chamber 130 and the holes 174 and 176 define a portion of the passages 84 and 86, respectively.

The third set of laminations 164 have a third pattern of openings 180 that cooperate to define the inboard passage 76, the outboard passage 84, and the outboard passage 86. The third pattern may include a first hole 182, a second hole 184, and a third hole 186. The holes 182 and 184 are the same as the holes 174 and 176. The first holes 182 define a portion of the passage 86, the second holes 184 define a portion of the passage 84, and the holes 186 define the passage 76.

The holes 182 of the third laminations 164 are aligned with the holes 174 of the second laminations 162 and with an end portion 190 of the V-openings 168 to form the passage 86. The holes 184 of the third laminations 164 are aligned with the holes 176 of the second laminations 162 and with an end portion 192 of the V-openings 168 to form the passage 84. The holes 186 of the third laminations 164 are aligned with a bottom portion 194 of the V-openings 168 and with the slots 172 to form the inboard passage 76.

Referring to FIG. 2, the sets of laminations are axially arranged in groups of like laminations. The sets of laminations may include a single grouping or multiple groupings. For example, the third set of laminations 164 may be the predominant type of lamination in the stator core 26 and may be arranged in three separate groupings (stacks) 200, 202, and 204. The first set of laminations 160 may include a single grouping 206 that is axially sandwiched between the grouping 200 and the grouping 202. The second set of laminations 162 may also include a single grouping 208 that is axially sandwiched between the grouping 202 and the grouping 204.

The above-described fluid circuit 60 effectively cools both the stator core 26 and the windings 40. The inboard passage 76 of the fluid circuit 60 is embedded radially deep in the core 26 to be with in the teeth 34 in order to cool the hottest portions of the stator core 26 while also providing a flow of fluid onto the windings 40.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

20 Electric machine
22 stator
24 laminations
26 stator core
28 outer surface
30 inner diameter
34 teeth
36 bobbins
40 windings
42 stator housing
44 inner surface
46 outer surface
48 hole
50 case
52 inner surface
60 fluid circuit
62 passageway
64 passage
66 passage
68 fluid chamber
70 annular chamber
72 passageway
74 entrance hole
76 passage
78 hole
80 end face
81 end face
82 hole
84 passage
86 passage
88 hole
90 hole
92 hole
94 hole
100 interconnecting passage
102 interconnecting passage
104 first end
106 second end
108 first end
110 second end
112 chamber
114 inlet opening
116 outlet opening
118 opening
120 opening
122 opening
124 opening
130 supply chamber
131 cut out
132 some portion
134 opening
136 opening
138 bottom
140 wall
142 wall
150 segment
152 segment
154 segment
160 first laminations
162 second laminations
164 third laminations
166 opening
168 opening
170 opening
172 slot
174 hole
176 hole
180 opening
182 hole
184 hole
186 hole
190 end portion
192 end portion
194 bottom portion
200 grouping
202 grouping
204 grouping
206 grouping
208 grouping

What is claimed is:

1. An electric machine comprising:
a stator core including opposing first and second end faces, an outer surface between the end faces, and a plurality of fluid passageways defined within the stator core, each fluid passageway including:
an entrance hole defined in the outer surface,
an inboard passage extending along a length of the core and in fluid communication with the entrance hole,
an outboard passage extending along a length of the core and having a first exit hole defined in the first end face, and
an interconnecting passage connecting the inboard passage in fluid communication with the outboard passage;
a stator housing defining a first annular fluid chamber circumscribing the entrance holes and configured to supply fluid to the entrance holes; and
a case defining a main supply passageway and a second annular fluid chamber in fluid communication with the main supply passageway and the first annular fluid chamber.

2. The electric machine of claim 1, wherein the entrance holes are circumferentially arranged in an array that extends at least partially around the outer surface.

3. The electric machine of claim 1, wherein the stator housing further has an outer surface and defines at least one hole extending from the outer surface to the first annular fluid chamber.

4. The electric machine of claim 3 wherein the second annular fluid chamber is recessed into an inner surface of the case and the hole of the stator housing is in fluid communication with the second annular fluid chamber.

5. The electric machine of claim 1, wherein all of the entrance holes have a common axial location.

6. The electric machine of claim 1, wherein each passageway further includes a supply passage extending from the entrance hole to the inboard passage.

7. The electric machine of claim 6, wherein the supply passage extends substantially radially.

8. The electric machine of claim 1, wherein the outboard passage extends completely through the stator core and further has a second exit hole defined in the second end face.

9. The electric machine of claim 1, wherein the inboard passage extends an entire length of the stator core.

10. The electric machine of claim 1, wherein each fluid passageway further includes:
a second outboard passage extending through the core and having a first exit hole defined in the first end face, and a second interconnecting passage connecting the inboard passage in fluid communication with the second outboard passage.

11. An electric machine comprising:
a stator housing having an inner surface defining a recessed annular fluid chamber;
a stator core received in the stator housing and having an outer surface disposed against the inner surface, the stator core defining at least one fluid passageway having an entry hole defined in the outer surface and opening into the annular fluid chamber and having a first passage defined in the stator core and extending substantially axially; and
a case defining a main fluid supply passageway and a second annular fluid chamber recessed into an inner surface of the case and in fluid communication with the supply passageway, wherein the annular fluid chamber of the stator housing is in fluid communication with the second annular fluid chamber via a hole defined in the stator housing.

12. The electric machine of claim 11, wherein the stator core defines a plurality of the at least one fluid passageway, wherein the entry holes are circumferentially arranged in an array that extends at least partially around the outer surface.

13. The electric machine of claim 11, wherein the stator housing has an outer surface and at least one hole extending between the outer surface and the annular fluid chamber.

14. The electric machine of claim 11, wherein the at least one fluid passageway includes a second passage defined in the stator core at a location that is radially outboard of the first passage and extending substantially axially and includes a third fluid passage extending from the second passage to the first passage.

* * * * *